July 14, 1970  J. BARBAS, JR., ET AL  3,520,600
INSTRUMENT WITH ADJUSTABLE INDEX
Filed Nov. 15, 1967  3 Sheets-Sheet 1

INVENTORS
JOSEPH BARBAS, JR.
WILLIAM N. WATROUS

BY Arnold, Roylance, Kruger & Durkee
ATTORNEYS

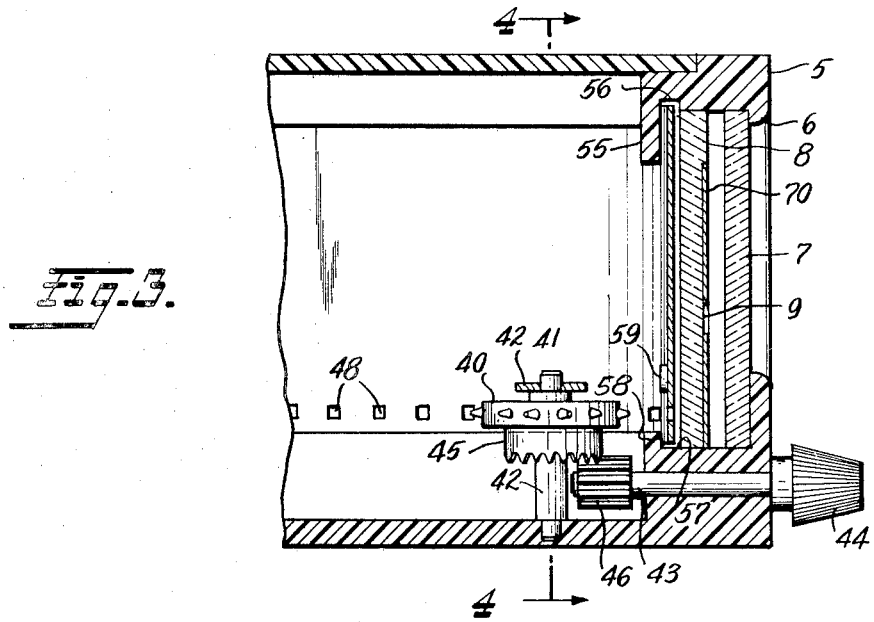
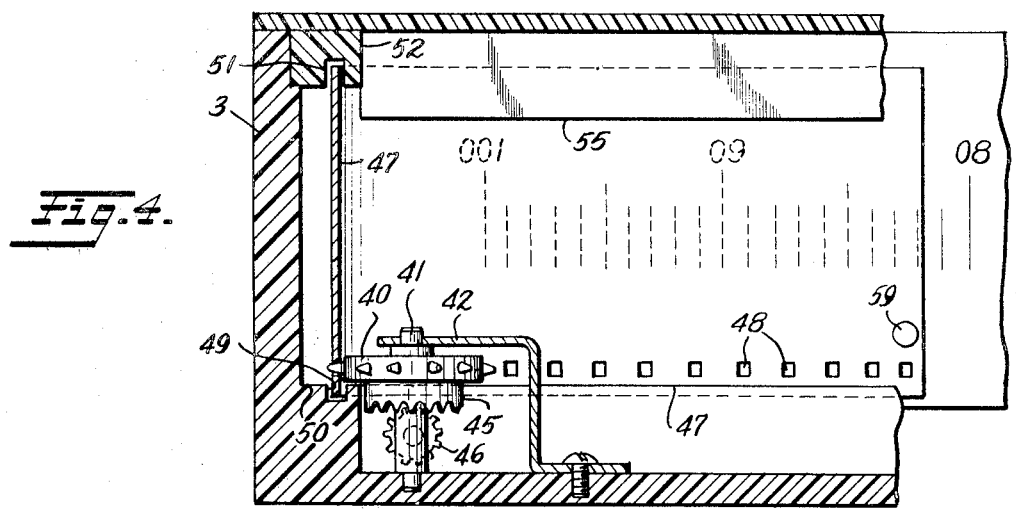

INVENTORS
JOSEPH BARBAS, JR.
WILLIAM N. WATROUS

United States Patent Office 3,520,600
Patented July 14, 1970

1

3,520,600
INSTRUMENT WITH ADJUSTABLE INDEX
Joseph Barbas, Jr., Newark, and William N. Watrous, South Plainfield, N.J., assignors to Weston Instruments, Inc., Newark, N.J., a corporation of Delaware
Filed Nov. 15, 1967, Ser. No. 683,322
Int. Cl. G03b 21/00
U.S. Cl. 353—40                                                6 Claims

ABSTRACT OF THE DISCLOSURE

An indicating instrument has a translucent screen with a transparent strip and scale indicia in the front of the instrument. The movable indicator is a spot of light, directed by a movable mirror mounted on a D'Arsonval meter movement, projected onto the back of the screen. A film sprocket is rotatably mounted near one end of the screen and drives a colored transparent film. Guide members extend perpendicular to the screen to support, store and guide the film. A gear drive interconnects the film sprocket and a knob at the front of the instrument so that manually rotating the knob causes the film to be extended across the back of the screen. The end of the film can be adjusted to establish a visible index. A similar sprocket, guide and film apparatus can be mounted near the other end of the screen, providing two individually adjustable indexes. When the light spot is moved onto a region occupied by one film, the color of the spot changes. The film can be viewed through the transparent strip on the screen for initial adjustment.

---

This invention relates to adjustable visible index apparatus for indicating instruments.

The prior art includes many kinds of instruments in which an elongated indicating scale, disposed either vertically or horizontally, is provided with indicia of values according to the phenomenon being displayed by the instrument, and a movable marker driven by an electrical meter movement, or by mechanical, pneumatic or hydraulic apparatus. When an input of a certain magnitude is supplied to the instrument, the movable marker is driven along the scale until it reaches the proper indicia to display the magnitude of the input.

In some instruments adjustable markers have been included to continuously display one or more limits or set points. As one example, an electrical instrument designed to display the magnitude of an input voltage can have a movable pointer and one or more adjustable pointers. The adjustable pointers can be moved by an operator to display upper and lower voltage limits which become the brackets for a voltage range. When the voltage input is applied, the pointer indicates the magnitude of that voltage and it is intended to become immediately apparent to the operator as he observes the instrument that the voltage is either within or not within the selected range. For this determination the proximity of the pointer to a particular portion of the value scale need not be interpreted once the adjustable markers are properly set. The determination can therefore be rapid and can be performed by one having relatively little skill, the markers having initially been properly set by a supervisor. Further, in a control operation wherein a large number of such instruments are mounted on a control panel and must be periodically checked, the operator need only look to see that all instruments are indicating values within the acceptable ranges.

In most such instruments the indicating pointer and the adjustable markers are very similar in appearance and are not easily distinguishable. Thus an operator might easily mistake one of the markers for the pointer and make an erroneous determination.

In an effort to avoid this problem, the markers are usually positioned to extend inwardly across the scale from one side and the pointer from the other. To avoid confusion, the visible portions of the pointer and markers are necessarily limited in length, rendering them less visible. Further, they must be limited in width to provide accuracy in reading and adjusting.

An object of the present invention is to provide an index apparatus for an indicating instrument in which the index is easily visible and readily distinguishable from the indicating pointer of the instrument.

Another object is to provide an indicating instrument provided with one or more adjustable index devices which are individually adjustable from the face of the meter.

A further object is to provide an indicating instrument having a light conducting scale and an illuminated indicator with adjustable range defining means cooperating with the indicator to change the color of the indicator when the selected range is exceeded.

Yet another object is to provide a scale which is illuminated from the rear and which is provided with a movable light conducting strip capable of indicating a preselected limit by a change in color.

A still further object is to provide apparatus for projecting a translucent or transparent film across the back of a light conducting screen, the position of the film being adjustable from the front of the screen.

The invention includes a light conducting screen having indicia on a front surface thereof. A track carries a colored light conducting film. The film is driven by the sprocket to extend the film behind the screen. In the environment of an instrument, an illuminated indicator is disposed to provide light to a location on the screen determined by the movable portion of the instrument. The film is adjustable to establish a limit so that the lighted location is a different color when it is outside the selected range.

In order that the manner in which the foregoing and other objects are attained in accordance with the invention can be understood in detail, particularly advantageous embodiments thereof will be described with reference to the accompanying drawings, which form a part of this specification, and wherein:

FIG. 3 is a side elevation, in partial section, of a film driving apparatus usable in the instrument of FIGS. 1 and 2;

FIG. 4 is a rear elevation of the apparatus of FIG. 3; and

Figure 1:
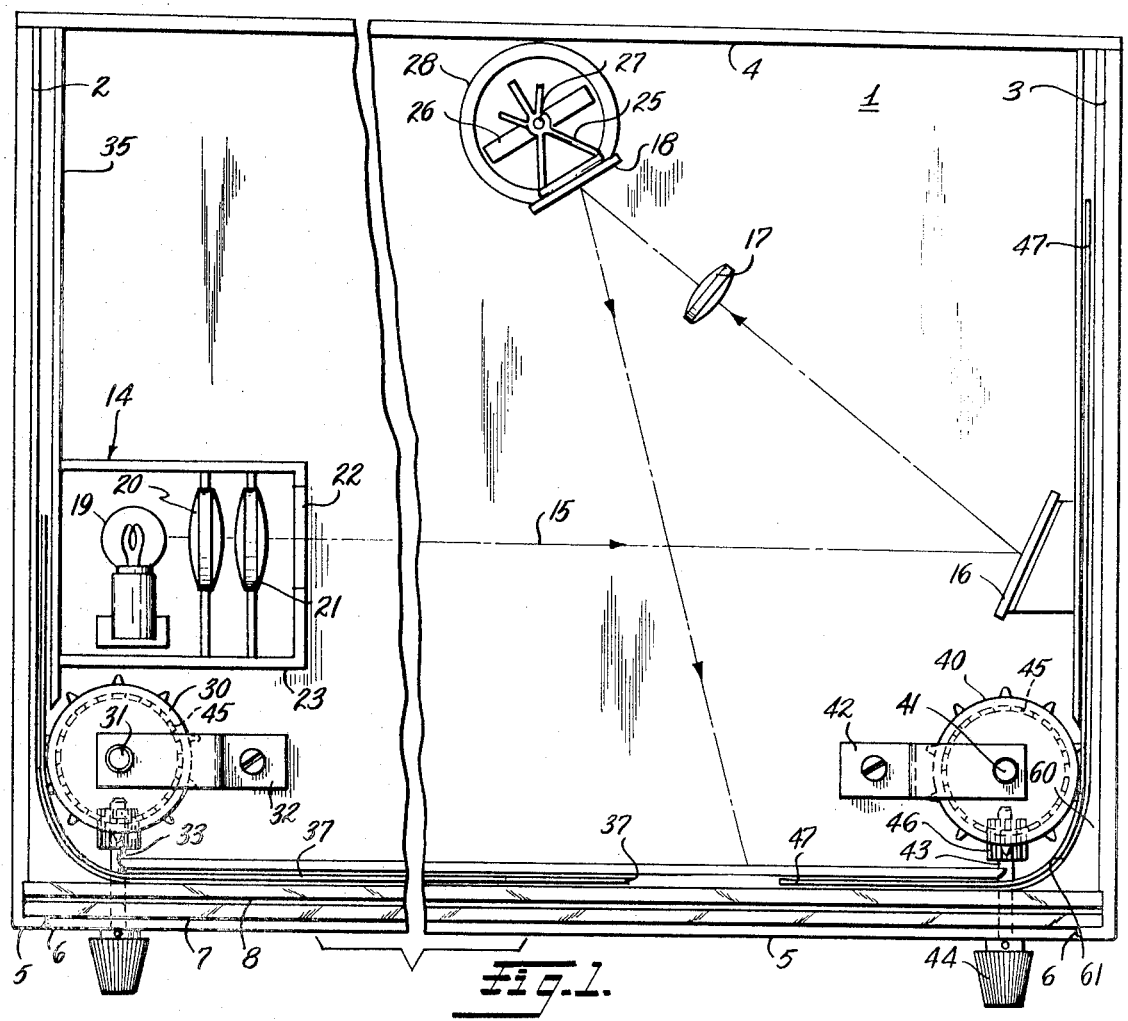
FIG. 1 is a plan view of the interior of an instrument including apparatus in accordance with the invention.

In FIG. 1, it will be seen that a preferred embodiment of an apparatus in accordance with the invention includes an instrument having a case indicated generally at 1 which includes parallel side walls 2 and 3, a back wall 4 and top and bottom members, the top having been omitted in FIG. 1 to show the interior of the instrument. The case also has a front wall 5 which has a rectangular opening 6 therein. A window 7 is mounted immediately behind the front wall and extends across the rectangular opening. A screen 8 is mounted behind the window, the window being transparent to expose the major portion of the screen to view from the front of the instrument. The interior walls of case 1 are normally opaque and can be blackened to minimize undesirable light reflections therein.

Figure 2:
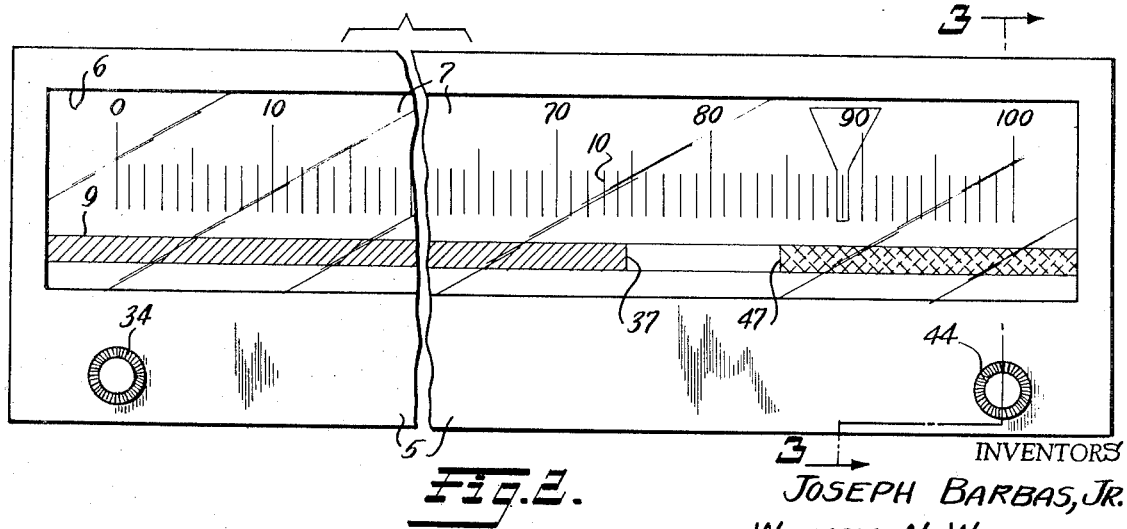
FIG. 2 is a front elevation of the instrument of FIG. 1.

Screen 8 is rectangular in shape and can be manufactured from a sheet of transparent glass, clear plastic, or the like. The front surface of the screen, at least that part of the screen which is exposed through rectangular opening 6, is frosted or otherwise rendered translucent to allow the passage of diffused light therethrough but to prevent direct view of the interior of the instrument. A strip 9 on the front of the screen 8 is made transparent rather than translucent for adjustment purposes to be described hereinafter. The screen also carries indicia 10 including scale graduations and identifying numerals to provide a scale of values consistent with the use to which the instrument is to be put. In the example of FIG. 2, the scale is divided into 100 parts, every tenth part being numbered. It will be recognized that the scale of values shown can represent 100° of temperature, 100 milliamperes, or 100 pounds, the particular environment of the instrument being no part of the present invention.

The case contains means for producing a movable indicator which is visible from the front of the instrument, the means including a light source indicated generally at 14 which produces a beam of shaped light 15 which is directed onto the reflective surface of a fixed mirror 16. The light beam is reflected by mirror 16 and passes through a projection lens 17 onto the reflective surface of a movable mirror 18 which directs the beam onto the back surface of screen 8. Light source 14 includes a conventional incandescent lamp 19, condensing lenses 20 and 21, and an image disk 22 which is an opaque disk having an aperture in the shape of the desired beam. Lamp 19 and lenses 20 and 21 are contained within an opaque container 23, disk 22 being mounted in one wall of the chamber. Thus the only light which is allowed to leave chamber 23 is light in the shape of the apertured disk 22. An image is therefore produced which is reflected by mirror 16, projected by lens 17 onto mirror 18, and focused onto screen 8.

Mirror 18 is mounted on a frame 25 which is attached to a rotatable apparatus 26, shown in FIG. 1, as the movable winding of a meter movement of the D'Arsonval type. Winding 26 is suitably journaled to rotate about an axis 27 within a magnet 28. Meter movements of the D'Arsonval type are well known in the art and need not be described more fully herein.

It will be recognized that the apparatus which supports and causes rotation of mirror 18 need not be a meter movement and need not be a movement of the D'Arsonval type. The apparatus shown can be replaced by a mechanical, hydraulic, pneumatic or electrical device of any suitable type, the only criterion being that the movement of mirror 18 be ultimately responsive to a physical quantity a characteristic of which is to be represented by an indication on the scale of values marked on screen 7. It will further be recognized that, although the apparatus of FIG. 3 demonstrates a meter which is intended to be mounted with its longest dimension in a horizontal plane, the meter could as easily be rotated 90°, the identifying numerals also being rotated so as to be easily readable in that position.

In one corner of case 1 near the juncture of wall 2 and screen 8 is mounted a sprocket 30. Sprocket 30 is rotatably mounted on an axle 31 which is journaled in a bearing bracket 32 and the bottom of case 1 and is provided with gear means, to be described hereafter, suitable to permit rotation of the sprocket by rotation of a shaft 33 which extends from beneath sprocket 30 through front wall 5 of case 1. An adjustment knob 34 is fixedly attached to the distal end of shaft 33.

A similar apparatus is provided in the corner of case 1 near the juncture of wall 3 and the other end of screen 8, this apparatus including a sprocket 40 mounted on an axle 41 which is rotatably journaled in a bracket 42 and in the bottom of case 1. Sprocket 40 is also provided with a gear mechanically coupling the sprocket to a shaft 43 which extends through wall 5 and terminates in a knob 44.

The details of the sprockets, gear drive, and guide means are shown more clearly in FIGS. 3 and 4. It will be understood that FIGS. 3 and 4 illustrate sprocket 40 and its associated apparatus, the apparatus associated with sprocket 30 being the mirror image of the apparatus shown.

Referring now to FIGS. 3 and 4, in conjunction with FIG. 1, it will be seen that the upper end of axle 41 is journaled in bracket 42, the lower end of axle 41 being journaled in the floor of case 1. The lower surface of sprocket 30 is fixedly attached to, or formed integrally with, the upper surface of a crown gear 45 which has axially downwardly extending teeth dimensioned to engage a drive gear 46 which is secured to the inner end of drive shaft 43. Thus, when knob 44 is rotated shaft 43 and gear 46 also rotates, the engagement of the teeth of gears 46 and 45 causing rotation of the crown gear and, hence, of the film sprocket. A transparent colored film 37 is stored in guide means 35 adjacent wall 2. A second transparent colored film 47 is similarly stored adjacent wall 3. Both films are provided with sprocket holes, the holes in film 47 being identified by the numeral 48 in FIGS. 3 and 4. The lower edge of film 47 is supported in a lower guide track 49 which is formed in an inwardly extending shoulder 50. Shoulder 50 is attached to, or forms a part of wall 3. Track 49 extends parallel to wall 3 and is in a plane tangent to the solid portion of sprocket 40, the shoulder and track terminating at a point behind the sprocket teeth to allow clearance for the teeth.

The upper edge of film 47 is guided by a track 51 which is a groove in a guide member 52. Member 52 and track 51 extend parallel to track 49 and wall 3. If knob 44 is rotated in a counterclockwise direction as viewed from the front of the instrument, sprocket 30 rotates in a clockwise direction as viewed from above. The teeth of the sprocket engage holes 48, causing film 47 to be extracted from the side guide members and pushed across the front of the instrument at the back of screen 8.

An additional guide member 55 is attached to the rear surface of the upper portion of front wall 5, the inner surface of member 55 and a shoulder 56 in wall 5 provide a guide for the upper edge of film 47 as it is caused to pass behind screen 8. The lower edge of film 47 is supported by an upwardly facing surface 57 of the lower portion of wall 5, a shoulder 58 providing an additional guide surface. A button 59 is attached to the end of film 47 to prevent it from overlapping film 37 which is provided with a similar button.

Figure 5:
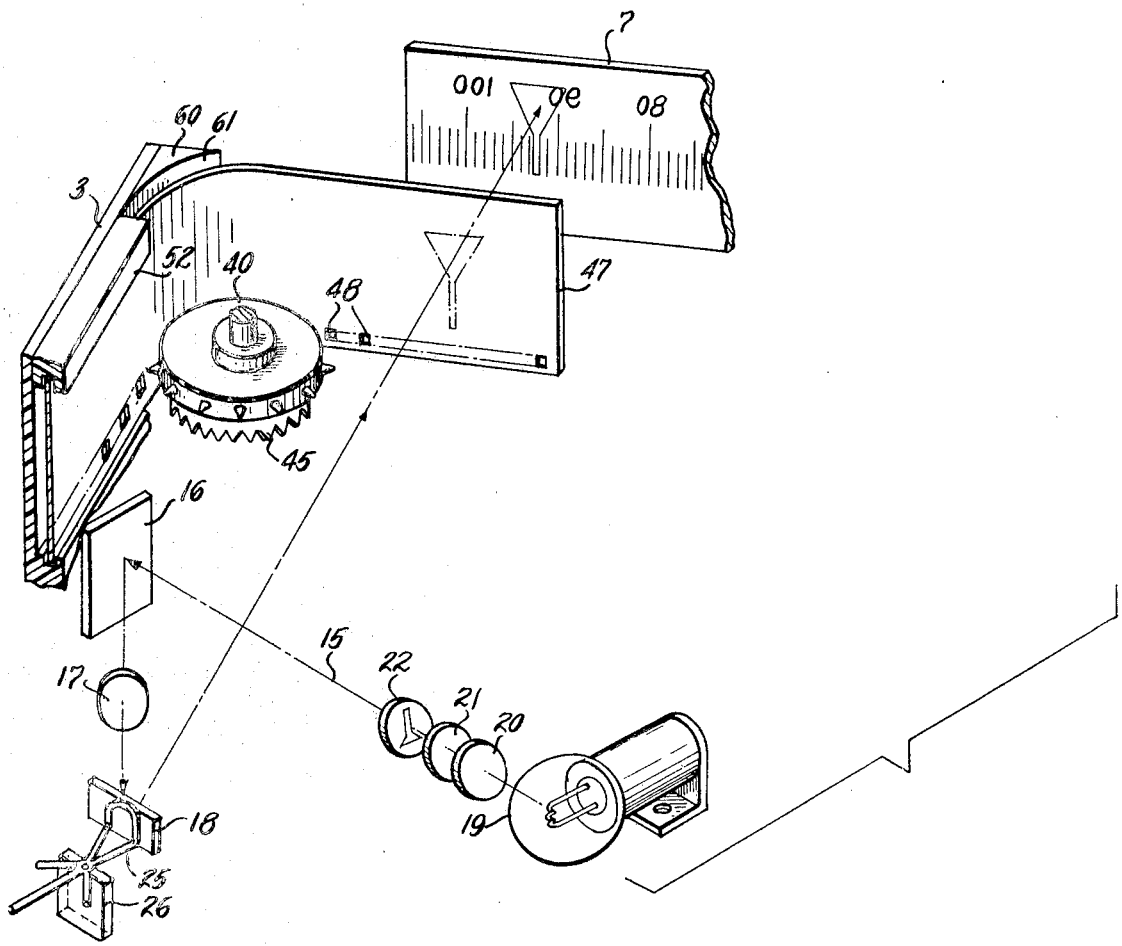
FIG. 5 is an exploded view of part of the apparatus of FIGS. 1–4.

As can most clearly be seen in FIG. 5, additional guide member 60 is mounted in the corner formed by walls 3 and 5. Member 60 presents a curved guide surface 61 which follows a circular arc centered on axle 41 to initially cause the leading end of film 47 to turn the corner and to maintain the sprocket holes 48 engaged with the teeth of sprocket 40.

As will be seen in FIG. 3, the front surface of screen 8, at least that portion of the screen which is visible through rectangular opening 6, is coated with a frosting material 70 or otherwise rendered translucent, except for a clear strip 9 which extends the width of the visible portion of the screen 8. It is to be recognized that film 47 is not normally visible through the translucent portion of screen 8 unless the light beam is directed by mirror 18 onto that portion of the screen behind which one of films 37 or 47 exists. The strip is therefore rendered transparent so that the film strips can be adjusted by rotating knobs 34 and 44 until the films reach desired positions with respect to the scale of values marked on the face of screen 8.

It will be recognized that an instrument in accordance with the present invention can be constructed with a single sprocket, mounted near either end of screen 8, so that an upper or lower limit is established by extension of the appropriate film. Alternatively, two sprockets can be used as shown to establish a range of values between the image projected by the light source and reflecting apparatus is to be maintained, indicating a range within which the physical quantity provided to the mirror-driving apparatus is to exist. If the physical quantity should depart from this range this departure is obvious to the operator by a change of color in the image produced by the filtering of the light through the colored film. Any color can, of course, be used the significance of a particular color being important only in a particular environment.

While one advantageous embodiment has been chosen to illustrate the invention, it will be understood by those skilled in the art that various changes and modifications can be made therein without departing from the scope of the invention as defined in the appended claims.

What is claimed is:

1. An indicating instrument comprising an elongated light-conducting screen mounted on the front end of the instrument and having a front viewing surface and a back surface, a scale of values extending substantially parallel to the longitudinal axis of said screen and being visible by viewing the instrument front end; an elongated flexible film for conducting only selected portions of the visible light spectrum; means for supporting and storing said film in a retracted position; said film having two edges and a row of spaced-apart holes adjacent one of said edges, rotatable film drive means mounted adjacent one end of said screen and including a shaft portion extending from the instrument front end substantially perpendicular to the screen front surface so as to be accessible for rotation from the exterior of the instrument front end, said drive means including gear means coupled to said shaft portion so as to be driven thereby and mounted for rotation interiorly of said instrument in mesh with the holes in said film for positively driving said film between said retracted position and an extended position upon rotation of said shaft portion; guide means for accepting said film in said extended position and for directing movement of said film parallel to and in close proximity with one surface of said screen; said film having a width and being positioned such that the extended one film edge with the holes therein is displaced from said front viewing surface, and means for illuminating at least a portion of said back surface of said screen.

2. Apparatus according to claim 1 wherein said screen comprises a rectangular planar member having a scale of values on one of said surfaces and a transparent strip extending parallel to the longitudinal axis of said screen, the remainder of the visible area of said member being translucent.

3. Apparatus according to claim 1 wherein said gear means comprises a sprocket; a driven gear affixed to and rotatable with said sprocket; a drive gear engaging said driven gear; said shaft portion being fixed to and rotatable with said drive gear; and a manually rotatable adjustment knob secured to the end of said shaft portion opposite said drive gear whereby rotation of said knob causes rotation of said sprocket.

4. Apparatus according to claim 1 wherein said guide means comprises, an elongated, rigid guide member mounted parallel to said back surface and having a first guide surface disposed to retain said film in close proximity to said back surface, and a second guide surface perpendicular to said first guide surface for supporting the extended portion of said film.

5. An indicating instrument comprising, a housing including a front wall, a bottom wall and first and second side walls mounted substantially perpendicular to said bottom wall and extending rearwardly therefrom, said front wall and said side walls forming opposite front corners of the housing and said front wall having an aperture therein; a light-transmitting screen having a longitudinal axis and an interior and exterior surface mounted in said aperture for displaying a parameter of interest with visible light; each of said side walls having an inner surface facing the inner surface of the other of said side walls and an upper and a lower edge; first and second upper tracks extending parallel to, and inwardly of, different ones of the upper edges of said side walls; first and second lower tracks adjacent said bottom wall extending parallel to, and inwardly of, different ones of the lower edges of said side walls opposite respective ones of said first and second upper tracks; first and second transparent, colored films, said first film being constrained for longitudinal sliding movement substantially perpendicular to said bottom wall by said first upper and lower tracks and said second film being similarly constrained for movement by said second upper and lower tracks, said first and second films each having a row of sprocket holes adjacent one edge thereof, said one edge being adjacent said bottom wall; first and second sprockets mounted on said bottom wall interiorly of a different one of said front corners for bidirectional rotation, each of said sprockets having radially outwardly extending teeth for engaging the sprocket holes of a respective one of said films, and when rotated, causing film movement along a respective one of said tracks; sprocket-drive means mounted for rotation on said housing and having a portion thereof extending outwardly of said front wall so as to be exteriorly adjustable from the front of said housing; and guide means for guiding said films across one surface of said screen as said films are moved along said tracks.

6. An indicating instrument comprising, a housing including a front wall; a bottom wall and first and second side walls mounted substantially perpendicular to said bottom wall and extending rearwardly therefrom, said front wall and said side walls forming opposite front corners of the housing and said front wall having an aperture therein; a light-transmitting screen having a longitudinal axis and an interior and exterior surface mounted in said aperture for displaying a parameter of interest with visible light; a scale of parameter values extending generally parallel to the longitudinal axis of said screen, each of said side walls having an inner surface facing the inner surface of the other of said side walls and an upper and a lower edge; first and second upper tracks extending parallel to, and inwardly of, different ones of the upper edges of said side walls; first and second lower tracks adjacent said bottom wall extending parallel to, and inwardly of, different ones of the lower edges of said side walls opposite respective ones of said first and second upper tracks; first and second transparent, colored films, said first film being constrained for longitudinal sliding movement substantially perpendicular to said bottom wall by said first upper and lower tracks and said second film being similarly constrained for movement by said second upper and lower tracks, said first and second films each having a row of sprocket holes adjacent one edge thereof, said one edge being adjacent said bottom wall; first and second sprockets mounted on said bottom wall interiorly of a different one of said front corners for bidirectional rotation, each of said sprockets having radially outwardly extending teeth for engaging the sprocket holes of a respective one of said films, and when rotated, causing film movement along a respective one of said tracks; sprocket-drive means mounted for rotation on said housing and having a portion thereof extending outwardly of said front wall so as to be exteriorly adjustable from the front of said housing; and guide means for guiding said films across the interior surface of said screen in directions parallel to the longitudinal screen axis as said films are moved along said tracks, said screen having an elongated aperture therein extending substantially coextensive with said scale in a direction substantially parallel to the longitudinal screen axis, the aperture being located between said scale and said sprocket holes so as to facilitate viewing of film positions.

References Cited

UNITED STATES PATENTS

| | | | |
|---|---|---|---|
| 2,569,579 | 10/1951 | Rinker | 353—41 |
| 3,221,561 | 12/1965 | Swartwout | 73—432 |

SAMUEL S. MATTHEWS, Primary Examiner